(12) United States Patent
Bin

(10) Patent No.: US 9,867,361 B2
(45) Date of Patent: *Jan. 16, 2018

(54) FAST ABSORPTION SIDE LEAKAGE PREVENTION PET URINAL PAD

(71) Applicant: Jiangsu Zhongheng Pet Articles Joint-Stock Co., Ltd., Jiangsu (CN)

(72) Inventor: Qiu Bin, Jiangsu (CN)

(73) Assignee: Jiangsu Zhongheng Pet Articles Joint-Stock Co., Ltd., Jiangsu (CN)

( * ) Notice: Subject to any disclaimer, the term of this patent is extended or adjusted under 35 U.S.C. 154(b) by 72 days.

This patent is subject to a terminal disclaimer.

(21) Appl. No.: 14/945,199

(22) Filed: Nov. 18, 2015

(65) Prior Publication Data

US 2016/0143246 A1 May 26, 2016

(30) Foreign Application Priority Data

Nov. 26, 2014 (CN) .................... 2014 2 0724917 U

(51) Int. Cl.
*A01K 1/015* (2006.01)

(52) U.S. Cl.
CPC .......... *A01K 1/0155* (2013.01); *A01K 1/0152* (2013.01); *A01K 1/0157* (2013.01)

(58) Field of Classification Search
CPC .. A01K 1/0155; A01K 1/0157; A01K 1/0152; A01K 1/0154; A01K 1/0107; A61F 13/15; A61F 13/47; A61F 13/475; A61F 13/4751; A61F 13/4756; A61F 13/4758; A61F 13/51; A61F 13/511; A61F 13/51104; A61F 13/51121; A61F 13/514; A61F 13/51401; A61F 13/53; A61F 2013/15186

USPC .................. 119/169, 161, 167, 170, 171, 172
See application file for complete search history.

(56) References Cited

U.S. PATENT DOCUMENTS

| | | | | |
|---|---|---|---|---|
| 3,284,273 A * | 11/1966 | Prentice | .................. | A61F 5/485 119/169 |
| 6,244,216 B1 * | 6/2001 | Ochi | .................... | A01K 1/0107 119/169 |
| 6,460,484 B2 * | 10/2002 | Ikegami | ............... | A01K 1/0107 119/161 |
| 2005/0166856 A1 * | 8/2005 | Kaneko | ................ | A01K 1/0107 119/169 |
| 2009/0000557 A1 * | 1/2009 | Takahashi | ............ | A01K 1/0157 119/161 |

(Continued)

*Primary Examiner* — Trinh Nguyen
(74) *Attorney, Agent, or Firm* — Osha Liang LLP

(57) ABSTRACT

A fast absorption side leakage-prevention pet urinal pad includes a urinal pad body that includes a stratiform structure, wherein the urinal pad body includes a non-woven fabric coating layer; an absorbing layer below the coating layer; and a PE film leakage-prevention layer below the absorbing layer; wherein a toilet paper absorbing layer is also arranged between the PE film leakage-prevention layer and the absorbing layer, wherein the absorbing layer comprises two parts: a fast absorbing layer in the middle of the urinal pad body and a mixed absorbing layer at the periphery of the fast absorbing layer, wherein a thickness of the urinal pad body at a location corresponding to the mixed absorbing layer is larger than the thickness of the urinal pad body at a location corresponding to the fast absorbing layer, thereby a recess structure is formed on the surface of the urinal pad body.

6 Claims, 1 Drawing Sheet

(56) References Cited

U.S. PATENT DOCUMENTS

| | | | |
|---|---|---|---|
| 2011/0146581 A1* | 6/2011 | Sasano | A01K 1/0107 119/171 |
| 2015/0150212 A1* | 6/2015 | Takagi | A01K 1/0107 119/161 |
| 2015/0164041 A1* | 6/2015 | Takahashi | A01K 1/0107 119/161 |
| 2015/0201579 A1* | 7/2015 | Takagi | A01K 1/0107 119/171 |
| 2015/0320009 A1* | 11/2015 | Sasano | A01K 1/0157 119/161 |
| 2015/0334985 A1* | 11/2015 | Takahashi | A01K 1/0157 119/171 |
| 2016/0338313 A1* | 11/2016 | Hasegawa | A01K 1/0107 |

* cited by examiner

FAST ABSORPTION SIDE LEAKAGE PREVENTION PET URINAL PAD

CROSS-REFERENCE TO RELATED APPLICATIONS

This application claims priority for Chinese Patent Application No. CN201420724917.1, filed on Nov. 26, 2014, the disclosure of which is incorporated by reference in its entirety.

TECHNICAL FIELD

The invention relates to a pet urinal mat, and more particularly, to a fast absorption side leakage prevention pet urinal pad, which belongs to the technical field of pet products.

BACKGROUND ART

Presently, with the improvement of people's living standards, pets (such as cats, dogs or the like) have entered the lives of people, playing an increasingly important role. People are also demanding more for the sanitation of the pets. But in daily life, it is very troublesome to dispose pet excreta, which require the pet masters to pay much attention. To protect the environments and also create a more comfortable habitat for the pets to meet the animal right demands, and meanwhile to reduce the tedious work of owners to sweep the pet excreta, quite a number of people have use pet urinal mats while keeping pets.

A currently pet urinal mat includes a non-woven fabric surface coating layer. An absorbing layer formed by mixing of wood pulp, PP fibers and super absorbent molecules is arranged below the non-woven fabric surface coating layer, and a PE film bottom leakage prevention layer is arranged on the external side of the absorbing layer. However, this pet urinal mat while in use cannot absorb urine in time in case of a large volume of pet urine, such that the pet urine may leak from the edges of the urinal mat.

SUMMARY OF THE INVENTION

An object of the present invention is to provide fast absorption, side leakage-prevention pet urinal pads so as to solve the foregoing problems in the prior art.

To solve the foregoing technical problem, the present invention employs a technical scheme as follows:

A fast absorption, side leakage-prevention pet urinal pad comprises a urinal pad body having a stratiform (layered) structure, which includes: a non-woven fabric coating layer, an absorbing layer below the coating layer, and a PE film leakage-prevention layer below the absorbing layer; a toilet paper absorbing layer is also arranged between the PE leakage-prevention layer and the absorbing layer; the absorbing layer comprises two parts: a fast absorbing layer in the middle of the urinal pad body and a mixed absorbing layer at the periphery of the fast absorbing layer; the thickness of the mixed absorbing layer of the urinal pad body is larger than the thickness of the fast absorbing layer, and, therefore, a recess (indentation) is formed in the middle section on the surface of the urinal pad body.

Furthermore, the thickness of the coating layer, at locations corresponding to the position of the mixed absorbing layer, is larger than the thickness of the coating layer, at locations corresponding to the position of the fast absorbing layer.

In another alternative structure, the thickness of the mixed absorbing layer is larger than the thickness of the fast absorbing layer.

The outer edges of the mixed absorbing layer, the coating layer, the leakage-prevention layer and the toilet paper absorbing layer are overlapped.

In accordance with embodiments of the invention, the fast absorbing layer may be formed by mixing of wood pulp, PP fiber and fast absorption super absorbent material; and the mixed absorbing layer may be formed by mixing of wood pulp and PP fiber.

For better absorption, a plurality of absorption holes may be uniformly arranged on the coating layer at locations corresponding to the fast absorbing layer.

In accordance with other embodiments, the upper layer of the coating layer at the position corresponding to the mixed absorbing layer is provided with an embossing layer.

The invention has one or more of the following advantageous effects: firstly, the absorbing layer is divided into two parts, and the thickness of the mixed absorbing layer on the periphery is larger so that a recess structure is formed on the entire surface of the urinal pad. Therefore, side leakage is prevented from occurring. Secondly, the pet urine may be reserved in the fast absorbing layer for a longer time, so that the fast absorbing layer can efficiently absorb the urine. Therefore, the utilization ratio is improved.

In the figures, structures of other parts that do not play a role of absorbing water are omitted.

In the figures: 1 refers to a coating layer, 2 refers to a fast absorbing layer, 3 refers to a mixed absorbing layer, 4 refers to a toilet paper absorbing layer, 5 refers to a leakage-prevention layer, and 6 refers to an embossing layer.

DETAILED DESCRIPTION OF THE PREFERRED EMBODIMENTS

The technical characteristics of the invention will be described in details hereinafter with references to the drawings and embodiments.

Figure 1:
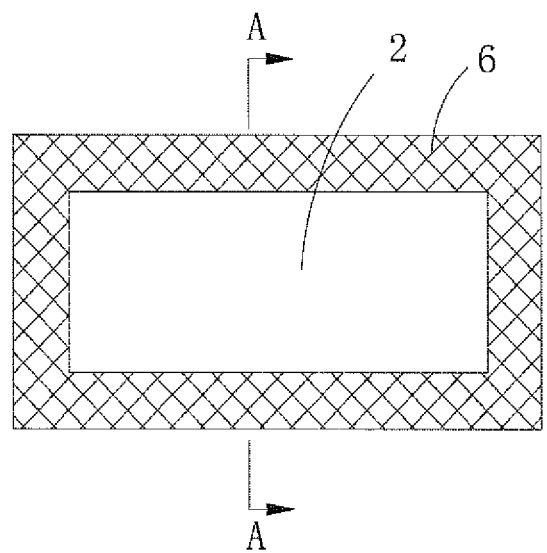
FIG. 1 is a structure diagram showing an embodiment of the invention.
Figure 2:
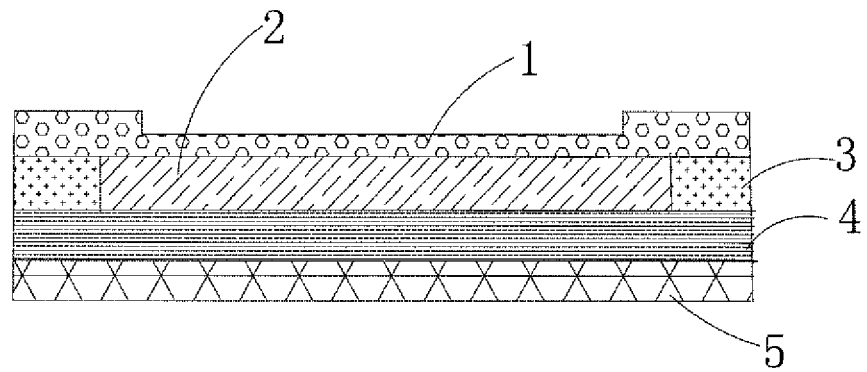
FIG. 2 is an A-A section structure diagram in FIG. 1.

According to a fast absorption side leakage-prevention pet urinal pad as shown in FIG. 1 and FIG. 2, a urinal pad body is a stratiform structure, which includes: a non-woven fabric coating layer 1, an absorbing layer below the coating layer 1 and a PE film leakage-prevention layer 5 below the absorbing layer, wherein a toilet paper absorbing layer 4 is also arranged between the leakage-prevention layer 5 and the absorbing layer; wherein the absorbing layer comprises two parts: a fast absorbing layer 2 in the middle section of the urinal pad body and a mixed absorbing layer 3 at the periphery of the fast absorbing layer 2. The thickness of the urinal pad body at the location corresponding to the mixed absorbing layer 3 is larger than the thickness at the position corresponding to the fast absorbing layer 2, thereby a recess (indentation) is formed on the surface of the urinal pad body.

In further embodiments, the thickness of the coating layer 1 at the position corresponding to the mixed absorbing layer 3 may be larger than the thickness at the position corresponding to the fast absorbing layer 2.

In another alternative structure, the thickness of the mixed absorbing layer 3 is larger than the thickness of the fast absorbing layer 2.

The outer edges of the mixed absorbing layer 3, the coating layer 1, the leakage-prevention layer 5 and the toilet paper absorbing layer 4 stack together (stack on top of each other).

In accordance with embodiments of the invention, the fast absorbing layer 2 may be formed by mixing of wood pulp, PP fiber and fast absorption absorbent polymer; and the mixed absorbing layer 4 may be formed by mixing of wood pulp and PP fiber.

The upper layer of the coating layer at a location corresponding to the mixed absorbing layer 4 is provided with an embossing layer 6.

For better absorption, a plurality of absorption holes 7 are uniformly arranged on the coating layer 1 at locations corresponding to the fast absorbing layer 2.

The invention has one or more of the following advantageous effects: the absorbing layer is divided into two parts, and the thickness of the mixed absorbing layer on the periphery may be larger so that a recess structure (indentation) is formed on the surface of the urinal pad. Therefore, side leakage is prevented from occurring.

During the course of use, when the pet urine cannot be absorbed at the fast absorbing layer 2 in time, the pet urine will be retained by the higher ridge (like a levee) on top of the mixed absorbing layer 3, so that the pet urine will be held above the fast absorbing layer 2 for a longer time. The fast absorbing layer 2 is effectively utilized, has good urine absorption effects, and can effectively prevent the pet urine from leaking out from the sides before completely absorbed by the fast absorbing layer 2.

What is claimed is:

1. An absorption side leakage-prevention pet urinal pad comprising a urinal pad body that comprises a stratiform structure, wherein the urinal pad body comprises:
    a non-woven fabric coating layer;
    an absorbing layer below the coating layer; and
    a PE film leakage-prevention layer below the absorbing layer;
    wherein the absorbing layer comprises two parts: a first absorbing layer in the middle of the urinal pad body and a mixed absorbing layer at the periphery of the first absorbing layer,
    wherein a thickness of the urinal pad body at a location corresponding to the mixed absorbing layer is larger than the thickness of the urinal pad body at a location corresponding to the first absorbing layer, thereby a recess structure is formed on the surface of the urinal pad body, and
    wherein a toilet paper absorbing layer is arranged above the PE film leakage-prevention layer and below the absorbing layer.

2. The absorption side leakage-prevention pet urinal pad according to claim 1, wherein the thickness of the coating layer at the location corresponding to the mixed absorbing layer is larger than the thickness of the coating layer at the location corresponding to the first absorbing layer.

3. The absorption side leakage-prevention pet urinal pad according to claim 1, wherein the thickness of the mixed absorbing layer is larger than the thickness of the first absorbing layer.

4. The absorption side leakage-prevention pet urinal pad according to claim 1, wherein the outer edges of the mixed absorbing layer, the coating layer, the leakage-prevention layer and the toilet paper absorbing layer stack together.

5. The absorption side leakage-prevention pet urinal pad according to claim 1, wherein a plurality of absorption holes are uniformly arranged on the coating layer at the location corresponding to the first absorbing layer.

6. The absorption side leakage-prevention pet urinal pad according to claim 1, wherein an embossing layer is provided on top of the coating layer at the location corresponding to the mixed absorbing layer.

* * * * *